(12) United States Patent
Li

(10) Patent No.: US 11,097,945 B1
(45) Date of Patent: Aug. 24, 2021

(54) METHODS AND SYSTEMS FOR PRODUCTION OF AN AQUEOUS HYPOCHLOROUS ACID SOLUTION

(71) Applicant: COUGAR CREEK ELECTROLYSED WATER, LLC, Kirkland, WA (US)

(72) Inventor: Liyu Li, Bellevue, WA (US)

(73) Assignee: COUGAR CREEK ELECTROLYSED WATER, LLC, Kirkland, WA (US)

( * ) Notice: Subject to any disclaimer, the term of this patent is extended or adjusted under 35 U.S.C. 154(b) by 0 days.

(21) Appl. No.: 17/089,537

(22) Filed: Nov. 4, 2020

(51) Int. Cl.
| C25B 15/02 | (2021.01) |
| C01B 11/04 | (2006.01) |
| C25B 1/22 | (2006.01) |
| C25B 9/00 | (2021.01) |
| C25B 11/04 | (2021.01) |
| C25B 11/042 | (2021.01) |

(52) U.S. Cl.
CPC ............ *C01B 11/04* (2013.01); *C25B 1/22* (2013.01); *C25B 9/00* (2013.01); *C25B 11/04* (2013.01); *C25B 11/042* (2021.01)

(58) Field of Classification Search
CPC ..... C01B 11/062; C01B 11/04; C01B 11/068; C01B 11/023; C01B 11/06; C25B 1/26; C25B 15/02; C25B 15/08

USPC ........................................................ 423/473
See application file for complete search history.

(56) References Cited

U.S. PATENT DOCUMENTS

| 9,005,410 B2 | 4/2015 | Hung |
| 10,094,030 B2 | 10/2018 | Rubinsky et al. |
| 10,246,327 B2 | 4/2019 | Almas |
| 10,294,103 B2 | 5/2019 | Barrett |
| 10,342,825 B2 | 7/2019 | Northey |
| 10,412,969 B2 | 9/2019 | Northey |
| 10,485,827 B2 | 11/2019 | Hoover |
| 10,525,158 B2 | 1/2020 | Tucker |
| 10,544,043 B2 | 1/2020 | Almas |
| 10,675,299 B2 | 6/2020 | Almas |
| 10,683,578 B2 | 6/2020 | Doering et al. |
| 2012/0269904 A1* | 10/2012 | Northey ................. A61P 17/00 424/661 |
| 2013/0048491 A1* | 2/2013 | Hung ...................... A61P 35/00 204/230.2 |
| 2016/0271171 A1* | 9/2016 | Almas .................. A61K 9/0014 |

* cited by examiner

*Primary Examiner* — Zulmariam Mendez
(74) *Attorney, Agent, or Firm* — Branch Partners PLLC; Bruce E. Black

(57) ABSTRACT

A method for making an aqueous hypochlorous acid (HClO) solution includes electrolyzing a solution of sodium chloride to produce a solution of sodium hypochlorite; and producing the aqueous hypochlorous acid solution by adjusting a pH of the solution of sodium hypochlorite to a value within a range of 3 to 8 by adding a selected weak acid to the solution of sodium hypochlorite to produce a buffer including the selected weak acid and a salt of the selected weak acid.

22 Claims, 2 Drawing Sheets

US 11,097,945 B1

METHODS AND SYSTEMS FOR PRODUCTION OF AN AQUEOUS HYPOCHLOROUS ACID SOLUTION

FIELD

The present invention is directed to the area of methods and systems for the production of an aqueous hypochlorous acid (HClO) solution. The present invention is also directed to methods and systems for the production of hypochlorous acid by consumers.

BACKGROUND

Hypochlorous acid has been found to have bactericidal and virucidal properties. Compared to sodium hypochlorite, which is often used as sterilizing agent, hypochlorous acid is said to be over 80 times more effective. Hypochlorous acid can keep hands smooth, is eco-friendly, and can be used directly to wash vegetables, fruits, and tableware. It can also effectively eliminate many pesticide residues on the surface of vegetables. Hypochlorous acid is approved by the US Food and Drug Administration (FDA) and recommended by Japan's Ministry of Health, Labour and Welfare as a food-grade germicidal solution.

BRIEF SUMMARY

One embodiment is a method for making an aqueous hypochlorous acid (HClO) solution that includes electrolyzing a solution of sodium chloride to produce a solution of sodium hypochlorite; and producing the aqueous hypochlorous acid solution by adjusting a pH of the solution of sodium hypochlorite to a value within a range of 3 to 8 by adding a selected weak acid to the solution of sodium hypochlorite to produce a buffer including the selected weak acid and a salt of the selected weak acid.

In at least some embodiments, the aqueous hypochlorous acid solution has no more than 500 ppm hypochlorous acid. In at least some embodiments, the method further includes adding a basic salt or a base to the solution of sodium chloride. In at least some embodiments, the basic salt or base reduces or absorbs chlorine gas generated during the electrolysis. In at least some embodiments, the basic salt or base is selected from sodium bicarbonate, sodium carbonate, or sodium hydroxide.

In at least some embodiments, the selected weak acid is acetic acid and the buffer is a combination of acetic acid and sodium acetate. In at least some embodiments, the buffer in the aqueous hypochlorous acid solution as a molar ratio of acetic acid to sodium acetate in a range from 1:100 to 100:1.

In at least some embodiments, the method further includes diluting the solution of sodium hypochlorite. In at least some embodiments, the solution of sodium hypochlorite after the electrolyzing has at least 500 ppm sodium hypochlorite. In at least some embodiments, the solution of sodium hypochlorite after the electrolyzing has at least 1000 ppm sodium hypochlorite.

In at least some embodiments, producing the aqueous hypochlorous acid solution includes producing the aqueous hypochlorous acid solution by adjusting a pH of the solution of sodium hypochlorite to a value within a range of 4 to 6. In at least some embodiments, electrolyzing the solution of sodium chloride includes electrolyzing the solution of sodium chloride in an electrolysis cell including at least one positive electrode and at least one negative electrode without a membrane or separator between the at least one positive electrode and the at least one negative electrode. In at least some embodiments, the method further includes transferring the solution of sodium hypochlorite from the electrolysis cell after the electrolyzing and, after the transferring, receiving the selected weak acid in the electrolysis cell. In at least some embodiments, the selected weak acid removes calcium or magnesium deposits one the electrode surface. In at least some embodiments, un-softened water is used in the system for solution preparation and for dilution.

In at least some embodiments, the method further includes generating, storing or re-generating a solution of sodium hypochlorite in the electrolysis cell while the hypochlorous acid product in the product tank is being consumed. In at least some embodiments, the method further includes regenerating the sodium hypochlorite solution by re-electrolyzing the sodium hypochlorite solution after storing for a predetermined time period, wherein the predetermined time period is at least twelve hours.

Another embodiment is a system for making an aqueous hypochlorous acid (HClO) solution. The system includes an electrolysis cell; a water tank or a coupling arrangement configured for coupling to an external water source; an acid tank configured for receiving a selected weak acid; a NaCl tank configured for receiving an aqueous sodium chloride solution; a product tank; conduits individually coupling the water tank, acid tank, NaCl tank, and product tank to the electrolysis cell; and a controller configured and arranged to perform actions when the NaCl tank contains the sodium chloride solution, the acid tank contains the selected weak acid, water is in the water tank or the system is coupled to a water source using the coupling arrangement, the actions including: directing a portion of the aqueous sodium chloride solution from the NaCl tank to the electrolysis cell; electrolyzing the portion of the solution of sodium chloride to produce a solution of sodium hypochlorite in the electrolysis cell; directing the solution of sodium hypochlorite into the product tank; and directing a portion of the selected weak acid in the acid tank into the solution of sodium hypochlorite to produce the aqueous hypochlorous acid solution by adjusting a pH to a value within a range of 3 to 8 by adding the selected weak acid to the solution of sodium hypochlorite to form a buffer using the selected weak acid and a salt of the selected weak acid.

In at least some embodiments, the system is configured to produce the aqueous hypochlorous acid solution by providing acetic acid in the acid tank and a NaCl solution in the NaCl tank. In at least some embodiments, the system is further configured to produce the aqueous hypochlorous acid when a base or a basic salt is provided in the sodium chloride solution to reduce production of chlorine gas, wherein the base or basic salt is selected from sodium hydroxide, sodium carbonate, or sodium bicarbonate.

In at least some embodiments, the electrolysis cell includes at least one positive electrode and at least one negative electrode without a membrane or separator between the at least one positive electrode and the at least one negative electrode. In at least some embodiments, at least one of the at least one positive electrode or the at least one negative electrode includes ruthenium and iridium. In at least some embodiments, at least one of the at least one positive electrode or the at least one negative electrode includes titanium.

In at least some embodiments, the system further includes a housing, wherein the electrolysis cell, water tank or coupling arrangement, acid tank, NaCl tank, product tank, and controller are disposed in the housing. In at least some embodiments, the system further includes at least one level indicator in at least one of the acid tank, NaCl tank, or product tank and coupled to the controller.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
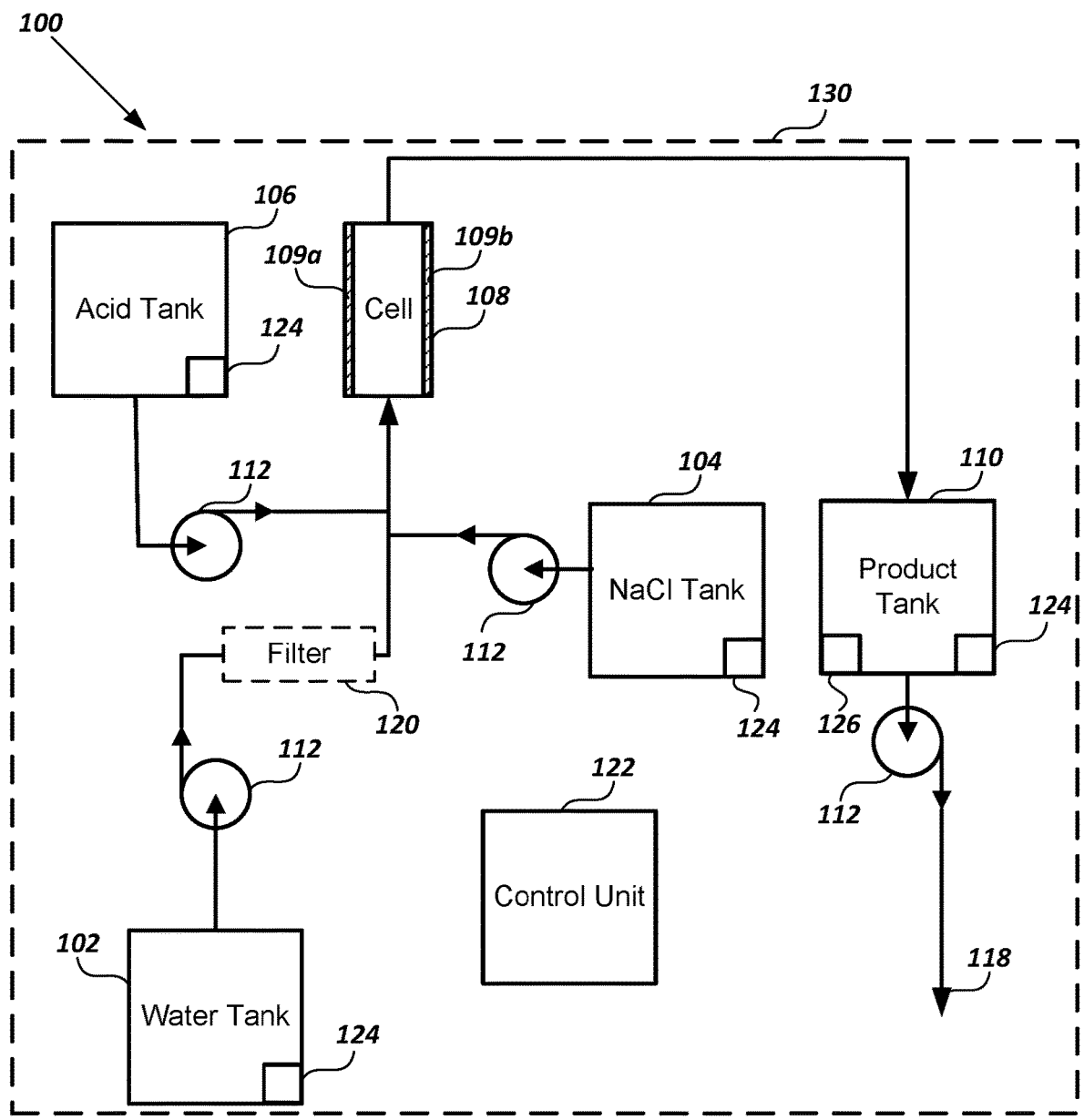
FIG. 1 is a schematic diagram of one embodiment of system for making an aqueous HClO solution, according to the invention.

The present invention is directed to the area of methods and systems for the production of hypochlorous acid (HClO). The present invention is also directed to methods and systems for the production of hypochlorous acid by consumers.

Many commercial methods of HClO production involve brine electrolysis using a cell with a membrane. These commercial methods may be relatively complicated and only practical for commercial-scale applications. Production of hypochlorous acid has also been achieved on a commercial scale by adding an acid, such as hydrochloric acid, to sodium hypochlorite (NaClO) via a precious pH control process. For small-scale, on-site, and on-demand applications, NaClO and HCl are not always available. In addition, the precious pH control during the mixing process is required to prevent or reduce the generation of toxic chlorine gas and may be difficult in non-industrial arrangements. A solution of sodium hypochlorite (NaClO) has been produced using a small, low cost electrochemical cell and a brine solution. However, sodium hypochlorite is more toxic to the human body.

Methods and systems for generating an aqueous hypochlorous acid solution are described herein. In at least some embodiments, the methods and systems can be used by consumers to produce the hypochlorous acid solution on a small-scale, on-site, or on-demand basis. In at least some embodiments, these methods and systems utilize readily available components, such as water, sodium chloride (NaCl), acetic acid (e.g., vinegar), and either sodium bicarbonate (e.g., baking soda), sodium carbonate (e.g., soda ash or washing soda), or sodium hydroxide (e.g., caustic soda or lye) to generate the hypochlorous acid. In at least some embodiments, the water is unsoftened.

The methods and systems described herein utilize the equilibrium of HClO and NaClO in aqueous solution where HClO is the dominate species in solutions with a pH between approximately 3 and approximately 7. In at least some embodiments, the methods and systems are configured to produce an aqueous hypochlorous acid solution with a pH in a range from 3 to 8, a range from 3.5 to 7, a range from 4 to 6.5, or a range from 4 to 6. HClO and NaClO typically reach equilibrium very quickly in solution. HClO exists stably at a pH range of at least 4 to 6.5.

To maintain the pH in the desired range, the aqueous hypochlorous acid solution has a buffer that includes a weak acid and a salt of the weak acid and which maintains the pH in the desired range. In at least some embodiments, the buffer includes acetic acid and a salt of acetic acid such as sodium acetate, aluminum acetate, ammonium acetate, or potassium acetate.

In at least some embodiments, the buffer can be formed by addition of a weak acid, such as acetic acid or the like, to the NaClO solution. The addition of acetic acid to the NaClO solution results in the formation of sodium acetate (which, in water, exists primarily in the form of sodium and acetate ions). Thus, in at least some embodiments, the buffer can be prepared using household chemicals, such as acetic acid (e.g., vinegar).

In water, $CH_3COONa:CH_3COOH$ in a 1:1 molar ratio gives a solution with pH of approximately 4.76. $CH_3COONa:CH_3COOH$ in a 10:1 molar ratio gives a solution with pH of approximately 5.76.

In at least some embodiments, the resulting aqueous hypochlorous acid solution is stable for at least 5, 10, 15, 30, 60, or more days.

In at least some embodiments, a buffer of acetic acid and an acetate salt, such as sodium acetate, can reliably keep the pH within a range of 4 to 6.5 with a molar ratio of acetic acid to acetate salt in a range from 1:100 to 100:1. In at least some embodiments, no accurate volumetric control is needed for pH control due to the buffer.

In at least some embodiments, the addition of a soluble basic salt or base may further facilitate formation of the buffer. For example, the addition of soluble sodium bicarbonate, sodium carbonate, or sodium hydroxide to the acetic acid may further the formation of sodium acetate (which, in water, exists primarily in the form of sodium and acetate ions). In at least some embodiments, the soluble basic salt or base can be household chemicals, such as sodium bicarbonate ($NaHCO_3$), commonly known as baking soda, sodium carbonate ($Na_2CO_3$), commonly known as soda ash or washing soda, or sodium hydroxide (NaOH), commonly known as caustic soda or lye. For example,

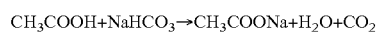

In at least some embodiments, adding the basic salt or base, such as, for example, $NaHCO_3$, $Na_2CO_3$, or NaOH, for the buffer into the NaCl solution can reduce $Cl_2$ generation during the electrolysis of NaCl.

In at least some embodiments, the components of the buffer are introduced separately during the production of the HClO solution.

Methods and systems for preparing an aqueous HClO solution include generating a concentrated NaClO solution in an electrochemical device from a solution containing NaCl, adjusting the pH of the NaClO solution using a buffer to produce the HClO solution, and diluting the as-produced NaClO or HClO to a desired concentration using water (preferably, unsoftened water).

The methods and systems include the electrochemical production of an aqueous NaClO solution from an aqueous NaCl solution according to the following equation:

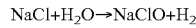

In at least some embodiments, the electrochemical production of aqueous NaClO is thought to proceed according to the following equations (although the invention does not rely on any particular mechanism or sequence of reactions):

$$2NaCl + 2H_2O \rightarrow Cl_2 + 2NaOH + H_2 \text{ (electrolysis)}$$

$$Cl_2 + H_2O \rightarrow HClO + HCl \text{ (disproportionation)}$$

$$HClO + HCl + 2NaOH \rightarrow NaClO + NaCl + 2H_2O \text{ (neutralization)}.$$

FIG. 1 illustrates one embodiment of a system 100 for production of an aqueous HClO (hypochlorous acid) solution. The system 100 includes a water source, such as water tank 102 or a coupling arrangement that can be coupled to a stream of water from an external source; a sodium chloride source, such as NaCl tank 104 containing an aqueous solution of sodium chloride and, optionally, the basic salt or base for reducing the generation of $Cl_2$ gas; a weak acid source, such as acid tank 106 containing the weak acid that forms the buffer; an electrolysis cell 108; and a product tank 110. Any of the tanks can be replaced by any other suitable reservoir or a coupling arrangement that can be coupled to a continuous or intermittent stream source.

The system 100 also includes a number of pumps 112 and various conduits 116, such as tubing or the like to carry the reactants and other components of the HClO solution, as well as the solution itself. Any other suitable mechanisms, methods, or techniques for flowing the components from the various sources to the electrolysis cell 108 and the product tank 110 can be used. For example, optional check valves may be used to prevent flow in the wrong directions. The HClO solution can be obtained at an outlet 118.

The system 100 also includes a control unit 122 that operates the system in general including the pumps 112, as needed. In at least some embodiments, the control unit 122 can include one or more user operable components, such as switches, buttons, a touchscreen, or the like to permit user control of the system 100.

The system 100 may include an optional filter 120 to filter the water from the water tank 102. In at least some embodiments with a filter 120, there may also be a conduit from the water tank 102 to the valve 114 that bypasses the filter 120. The pumps 112 can be individually any suitable type of pump including, but not limited to, peristaltic pumps, diaphragm pumps, centrifugal pumps, or the like. The pumps 112 can be all the same type of pump or different types of pumps.

In at least some embodiments, one or more of the water tank 102, NaCl tank 104, acid tank 106, or product tank 110 can include a level gauge 124 to monitor the level of the respective solution or component in that tank. In at least some embodiments, the control unit 122 monitors the level gauge(s) 124 and, preferably, alerts a user if any level gauge drops below a predetermined level or rises above a predetermined level. Level gauges 124 in the water tank 102, NaCl tank 104, or acid tank 106 may indicate when additional source materials (e.g., water, NaCl, or weak acid) are needed. A level gauge 124 in the product tank 110 can indicate how much hypochlorous acid solution is presently available. In at least some embodiments, the product tank 110 may include one level gauge to monitor or warn for low fluid level and another level gauge to monitor or warn for high fluid level.

In at least some embodiments, the product tank 110 (or any other tank) may include a pH gauge 126. In at least some embodiments, the control unit 122 monitors the pH gauge 126. In at least some embodiments, the control unit 122 may alert a user if any pH gauge is outside a desired pH range and the control unit 122 may direct the user to dispose of the contents of the product tank 110. In at least some embodiments, the control unit 122 may automatically (or under user direction) pump the weak acid from the acid tank 106 or the solution containing the basic salt from the NaCl tank 104 to adjust the pH.

Any suitable electrolysis cell 108 with two or more electrodes 109a, 109b can be used. In at least some embodiments, the electrolysis cell 108 does not include a membrane or separator between the electrodes 109a, 109b. In at least some embodiments, the surface of the positive electrode(s) 109a or negative electrode(s) 109b contains ruthenium, iridium, or any combination thereof. In at least some embodiments, the surface of the negative electrode(s) 109b contains platinum. In at least some embodiments, a bulk material of the positive and negative electrode(s) 109a, 109b is titanium, although any other suitable metal, alloy, or combination thereof can be used.

In at least some embodiments, the system 100 can be disposed in a single housing 130. In at least some embodiments, the system 100 and housing 130 can be portable. In at least some embodiments, as indicated above, instead of a water tank 102 (or other tank), the system 100 may include a coupling arrangement to couple to a streaming source of water (or other component). In at least some embodiments, one or more of the water tank 102, acid tank 106, NaCl tank 104, or product tank 110 can be disposed outside the housing 130.

Figure 2:
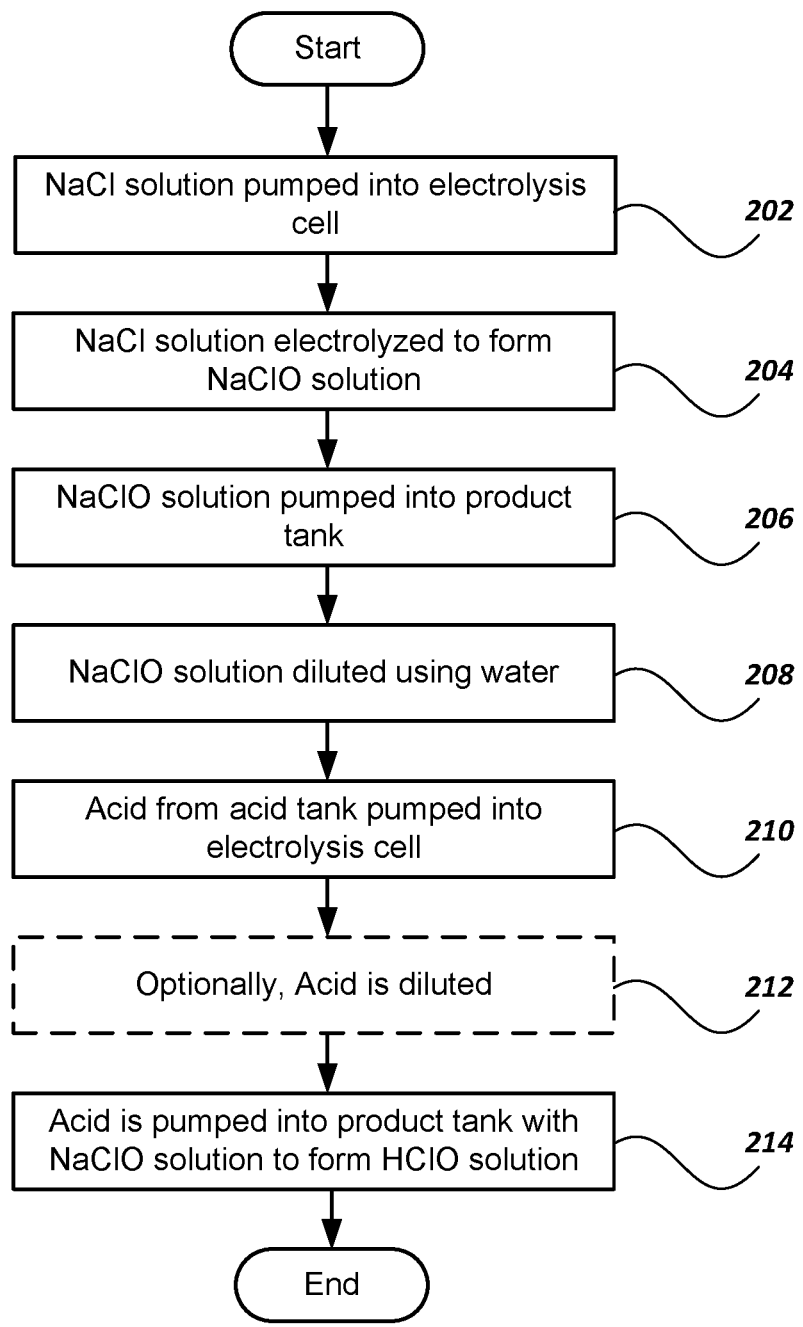
FIG. 2 is a flowchart of a one embodiment of method for making an aqueous HClO solution, according to the invention.

FIG. 2 is a flowchart of operation of the system to produce an aqueous solution of HClO. In step 202, a portion of the NaCl solution from the NaCl tank 104 is pumped into the electrolysis cell 108. In at least some embodiments, the NaCl solution includes a basic salt or base (for example, sodium bicarbonate, sodium carbonate, or sodium hydroxide) to reduce the generation of $Cl_2$ gas during the electrolysis. In at least some embodiments, the NaCl solution includes at least 5, 10, 20, 30, 50, 100, 200, or 300 grams (or more) of NaCl per liter of water. In at least some embodiments, the NaCl solution includes, for example, 0.1, 0.25, 0.5, or 1 gram of the basic salt or base per liter of the NaCl solution. In at least some embodiments, pre-prepared concentrated NaCl solution and a weak acid solution are used to prepare the NaCl solution and the weak acid solution in tanks 104 and 106.

In step 204, the NaCl solution is electrolyzed in the electrolysis cell 108 to produce an aqueous NaClO solution as described above. In at least some embodiments, the concentration of NaClO in the aqueous NaClO solution produced in the electrolysis cell 108, prior to dilution, is at least 500, 1000, or 5000 ppm. In at least some embodiments, the on-site generation of high concentration NaClO via electrolysis of high concentration NaCl is safe and efficient due to high concentration of the NaCl reactant and high solution conductivity. In at least some embodiments, the consumption of NaCl is no more than 0.4, 0.5, or 1 gram of NaCl per liter of aqueous HClO solution.

In step 206, the NaClO solution is pumped into the product tank 110 and, in step 208, the NaClO solution is diluted using water from the water tank 102. Steps 206 and 208 can be performed in any order so that the NaClO solution is diluted before or after being pumped into the product tank 110. In some embodiments, step 208 is skipped, and dilution occurs during later steps.

In step 210, after the electrolysis cell 108 is emptied, the weak acid from the acid tank 106 flows into the electrolysis cell 108 and, optionally, at least partially cleans the electrolysis cell of deposits such as calcium carbonate or magnesium carbonate residue. In at least some embodiments, the weak acid in the acid tank 106 is acetic acid and has a molarity of at least 0.1 or 0.3 M and may be in the range of 0.1 to 16 M. In optional step 212, the weak acid is diluted in the electrolysis cell 108 using water from the water tank 102.

In step 214, the acid, after optional dilution, is pumped into the product tank 110 and combined with the NaClO solution. The weak acid forms a buffer to adjust the pH to a range from 3 to 8, a range from 3.5 to 7, a range from 4 to 6.5, or a range from 4 to 6 to produce the aqueous HClO solution. In at least some embodiments, the dilution of the NaClO or HClO solution during steps 208 and 214 is at least a factor of 25, 50, 75, 100, 150, or 200 or more.

The user can remove the aqueous HClO solution through the outlet 118. In at least some embodiments, the concentration of HClO in the aqueous HClO solution, after dilution in the product tank 110, is in a range from 1 to 500 ppm.

In at least some embodiments, the operation of the system 100 can be continuous with the steps in FIG. 2 repeated on a continuous cycle. In at least some embodiments, the system 100 can be programmed so that the operation of the system 100 is repeated on a regular or periodic basis. In at least some embodiments, the system 100 can be programmed so that the operation of the system 100 is repeated based on measurements from the level gauge 124 in the product tank 110.

In at least some embodiments, the system 100 can store the concentrated NaClO solution or the diluted NaClO solution for periods of time (minutes, hours, or days) prior to introduction of the weak acid. In at least some embodiments, the concentrated NaClO solution or the diluted NaClO solution can be stored in the electrolysis cell 108, the product tank 110, or another storage tank (not shown) or any combination thereof.

In at least some embodiments, the aqueous hypochlorous acid solution is kept in the product tank. When the aqueous hypochlorous acid solution is consumed, a NaClO solution for the next batch of the aqueous hypochlorous solution is generated in the electrolysis cell 108 as described above and is stored in the electrolysis cell until the NaClO solution is needed to produce the next batch of the aqueous hypochlorous acid solution. Then, the NaClO solution is transferred to the product tank, diluted, and weak acid is added to produce more of the aqueous hypochlorous acid solution. In at least some embodiments, there may be limit (for example, 12 or 24 hours) to the length of time that the NaClO solution can remain in the electrolysis cell before reverting, at least in part, to an NaCl solution via the reaction below. In at lease some embodiments, the NaClO/NaCl solution in the electrolysis cell is re-charged every 24 hours as described above, or may be re-charged every 12 to 120 hours, or may be re-charged before producing next batch hypochlorous product.

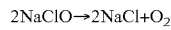

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A system for making an aqueous hypochlorous acid (HClO) solution, the system comprising:
   an electrolysis cell;
   a water tank or a coupling arrangement configured for coupling to an external water source;
   an acid tank configured for receiving a selected weak acid;
   a NaCl tank configured for receiving an aqueous sodium chloride solution;
   a product tank;
   conduits individually coupling the water tank, acid tank, NaCl tank, and product tank to the electrolysis cell; and
   a controller configured and arranged to perform actions when the NaCl tank contains the aqueous sodium chloride solution, the acid tank contains the selected weak acid, water is in the water tank or the system is coupled to a water source using the coupling arrangement, the actions including:
      directing a portion of the aqueous sodium chloride solution from the NaCl tank to the electrolysis cell;
      electrolyzing the portion of the aqueous sodium chloride solution to produce a solution of sodium hypochlorite in the electrolysis cell;
      directing the solution of sodium hypochlorite into the product tank; and
      directing a portion of the selected weak acid in the acid tank into the solution of sodium hypochlorite to produce the aqueous hypochlorous acid solution by adjusting a pH to a value within a range of 3 to 8 by adding the selected weak acid to the solution of sodium hypochlorite to form a buffer using the selected weak acid and a salt of the selected weak acid.

2. The system of claim 1, wherein the system is configured to produce the aqueous hypochlorous acid solution by providing acetic acid in the acid tank and a NaCl solution in the NaCl tank.

3. The system of claim 2, wherein the system is further configured to produce the aqueous hypochlorous acid solution when a basic salt or a base is provided in the aqueous sodium chloride solution to reduce production of chlorine gas.

4. The system of claim 1, wherein the electrolysis cell comprises at least one positive electrode and at least one negative electrode without a membrane or separator between the at least one positive electrode and the at least one negative electrode.

5. The system of claim 4, wherein at least one of the at least one positive electrode or the at least one negative electrode comprises ruthenium and iridium.

6. The system of claim 4, wherein at least one of the at least one positive electrode or the at least one negative electrode comprises titanium.

7. The system of claim 1, further comprising a housing, wherein the electrolysis cell, water tank or coupling arrangement, acid tank, NaCl tank, product tank, and controller are disposed in the housing.

8. The system of claim 1, further comprising at least one level indicator in at least one of the acid tank, NaCl tank, or product tank and coupled to the controller.

9. The system of claim 1, wherein the system is configured to produce the aqueous hypochlorous acid solution which has no more than 500 ppm hypochlorous acid.

10. The system of claim 3, wherein the basic salt or base is selected from sodium bicarbonate, sodium carbonate, or sodium hydroxide.

11. The system of claim 1, wherein the selected weak acid is acetic acid and the buffer is a combination of acetic acid and sodium acetate.

12. The method of claim 11, wherein the buffer in the aqueous hypochlorous acid solution has a molar ratio of acetic acid to sodium acetate in a range from 1:100 to 100:1.

13. The system of claim 1, wherein the actions further comprise diluting the solution of sodium hypochlorite.

14. The system of claim 1, wherein the controller is configured so that the solution of sodium hypochlorite after the electrolyzing has at least 500 ppm sodium hypochlorite.

15. The system of claim 1, wherein the controller is configured so that the solution of sodium hypochlorite after the electrolyzing has at least 1000 ppm sodium hypochlorite.

16. The system of claim 1, wherein producing the aqueous hypochlorous acid solution comprises producing the aqueous hypochlorous acid solution by adjusting a pH of the solution of sodium hypochlorite to a value within a range of 4 to 6.

17. The system of claim 1, wherein the actions further comprise transferring the solution of sodium hypochlorite from the electrolysis cell after the electrolyzing and, after the transferring, receiving the selected weak acid in the electrolysis cell.

18. The system of claim 1, wherein the actions further comprise generating or regenerating a solution of sodium hypochlorite in the electrolysis cell while the aqueous hypochlorous acid solution in the product tank is being consumed.

19. The system of claim 1, wherein the actions further comprise regenerating a solution of sodium hypochlorite in the electrolysis cell while the aqueous hypochlorous acid solution in the product tank is being consumed.

20. The method of claim 19, wherein regenerating the solution of sodium hypochlorite comprises re-electrolyzing the solution of sodium hypochlorite after storing for a predetermined time period, wherein the predetermined time period is at least twelve hours.

21. The system of claim 1, wherein the actions further comprise storing a solution of sodium hypochlorite in the electrolysis cell while the aqueous hypochlorous acid solution in the product tank is being consumed.

22. The system of claim 1, wherein the electrolysis cell comprises at least one positive electrode and at least one negative electrode.

\* \* \* \* \*